United States Patent [19]

Richards

[11] 3,911,988

[45] Oct. 14, 1975

[54] PRESSURIZATION CONTROL DEVICE

[75] Inventor: Don Lee Richards, Durham, N.C.

[73] Assignee: Eaton Corporation, Cleveland, Ohio

[22] Filed: Feb. 21, 1974

[21] Appl. No.: 444,604

[52] U.S. Cl. ............... 152/427; 137/225; 137/613; 137/505.25
[51] Int. Cl. .......................................... F16K 15/70
[58] Field of Search .......... 137/224, 505.25, 505.42, 137/225, 226, 613, 231; 152/415, 427

[56] References Cited
UNITED STATES PATENTS

| | | | |
|---|---|---|---|
| 614,441 | 11/1898 | Burnett | 137/505.25 |
| 1,873,303 | 8/1932 | Delangie | 137/225 |
| 1,905,042 | 4/1933 | Moore | 137/225 |
| 3,280,879 | 10/1966 | Simms | 152/427 |

*Primary Examiner*—Harold W. Weakley
*Attorney, Agent, or Firm*—Teagno & Toddy

[57] ABSTRACT

A pressurization control device which limits the pressurization or inflation of pressurized or inflatable containers, such as pneumatic tires. The control device selectively opens permitting the inflation of inflatable containers to a predetermined pressure and then automatically closes preventing further inflation. In one embodiment, the control device is utilized to inflate a container, such as a tire, and is received through an aperture in the container or tire rim and is sealingly mounted thereto, while in a second embodiment the control device is engageable with a tire valve stem which, in turn, is received through and is sealingly mounted to an aperture in the container or tire rim.

11 Claims, 4 Drawing Figures

U.S. Patent  Oct. 14, 1975  3,911,988
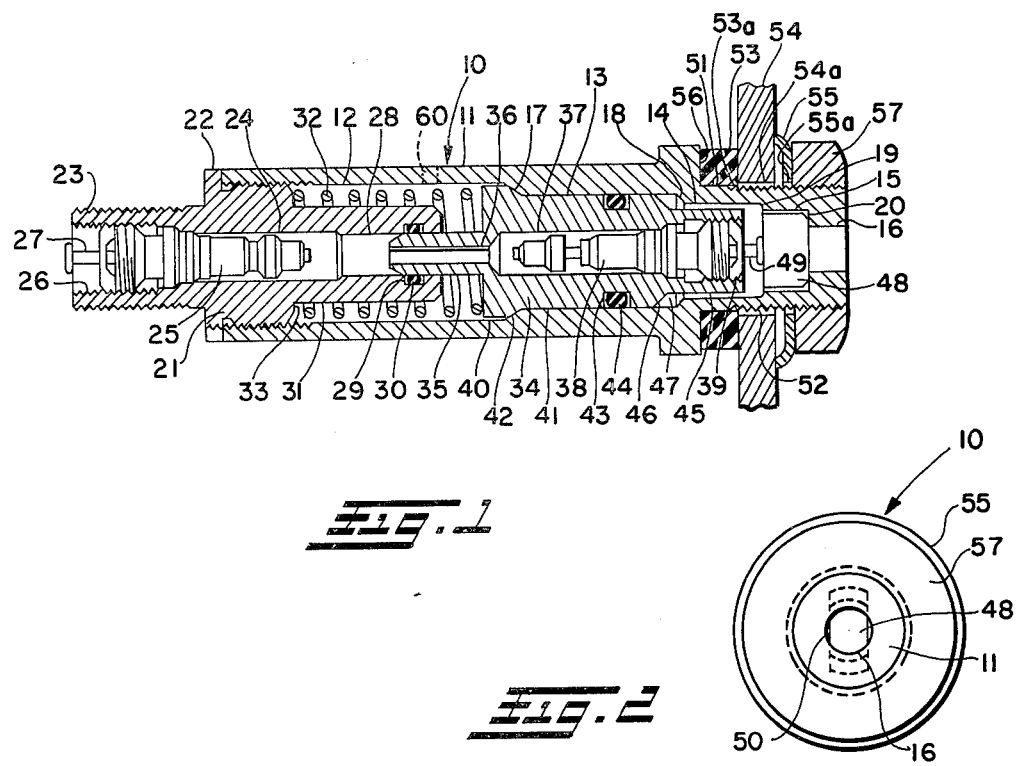
Fig. 1
Fig. 2
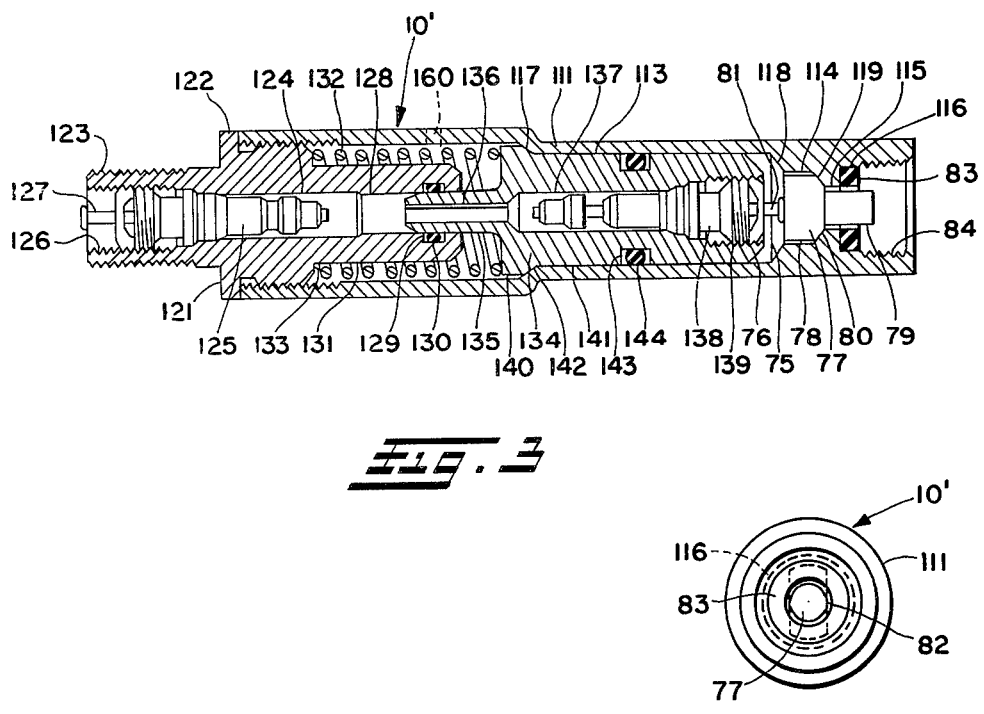
Fig. 3
Fig. 4

PRESSURIZATION CONTROL DEVICE

BACKGROUND OF THE INVENTION

1. Field of the Invention

This invention relates generally to pneumatic pressure inflation valves, and more particularly to pneumatic inflation valves that limit the pressurization or inflation of a pressurized or inflatable container, such as a pneumatic tire, to a predetermined pressure regardless of the air supply pressure.

2. Description of the Prior Art

The purpose of limiting the pressurization or inflation of a pressurized or inflatable container, such as a pneumatic tire, is to prevent rupture of the container or "blow-out" of the tire because of excessive pressure. In the past, the valves available to limit such pressure were primarily relief valves. These valves were designed to allow the escape of excess air when the internal pressure of the container or tire exceeded a predetermined pressure. This condition of excessive internal pressure could arise after inflation if an increase in the temperature of the container or tire occurred. It could also arise during the inflation process since the relief valves allowed the container or tire to be inflated to the supply pressure, regardless of what that pressure was, and then permitted the container or tire to deflate to the desired predetermined pressure after the supply source was removed. Thus, these valves did not prevent over-inflation during the inflation process, but merely allowed the escape of excess air to the desired predetermined pressure after over inflation. Therefore, when using one of these prior art relief valves, it is still possible to rupture the container or blow-out the tire during the inflation process. Such valves relieve an over-inflation condition, but do not prevent such condition from arising.

Because of the problem of possible over-inflation due to high air supply pressure, it has become desirable to find a valve that will not permit inflation of an inflatable container or tire above a predetermined pressure, regardless of the pressure of the air supply.

SUMMARY OF THE INVENTION

The present invention provides a solution to the above described problem of over-inflation of inflatable containers, such as pneumatic tires, by permitting inflation only to a desired predetermined pressure, regardless of the air supply pressure. When the predetermined pressure is reached in the interior of the container or tire, valving within the device automatically closes preventing further inflation of the container or tire. Thus, the container or tire is prevented from becoming over-inflated, regardless of the supply pressure.

In one embodiment of the invention, the device is received through an aperture in the container or the tire rim and is sealingly mounted thereto; while in another embodiment, the device engages a valve stem, such as a standard tubeless tire valve stem, which is received through and sealingly mounted to the container or tire rim. Both embodiments utilize the same valving concept in that the inflation passage is partially controlled by a tire valve core, biased in the open position, which closes when the container or tire reaches a predetermined pressure. To accomplish this method of operation, the valve core is mounted within a piston which slides within the bore of this device. A spring biases the piston so that the tire valve core is held open. As the container or tire is inflated, back pressure develops which causes the piston to compress the spring which, in turn, permits the tire valve core to close, stopping the flow of air to the container or tire. Thus, there is no possibility of over-inflation of the container or tire since the normally open tire valve core closes automatically at a predetermined pressure, determined by the constant of the spring, regardless of the air supply pressure.

BRIEF DESCRIPTION OF THE DRAWINGS

FIG. 1 is a front cross-sectional view which shows the configuration of the embodiment of the pressurization control device received through an aperture in a container or tire rim.

FIG. 2 is a side view of the embodiment shown in FIG. 1.

FIG. 3 is a cross-sectional view which shows the configuration of the embodiment of the pressurization control device attached to a tire valve stem.

FIG. 4 is a side view of the embodiment shown in FIG. 3.

DESCRIPTION OF THE PREFERRED EMBODIMENT

Referring now to FIGS. 1 and 2, in a preferred form of the invention, the device 10 has an outer casing 11 which has a multiplicity of concentric bores, identified by numerals 12, 13, 14, 15 and 16, having progressively smaller diameters proceeding from left to right. Bores 12, 13, 14 and 15 are connected by truncated conical surfaces 17, 18 and 19, whereas bores 15 and 16 are connected by a shoulder 20. A vent hole 60 may be provided in outer casing 11 to relieve any back pressure which might hinder the operation of the device.

An inner member 21 is inserted into bore 12 of outer casing 11 until a flange-like portion 22 of inner member 21 is in contact with the outer casing. Inner member 21 may be attached to outer casing 11 by ultrasonic welding techniques, if the component material is compatible with such a process, or by the engagement of internal threads in bore 12 with external threads provided on inner member 21. The portion of inner member 21 identified by the numeral 23 is of reduced diameter and threaded for a portion thereof. These threads are provided for the attachment of an air source, such as a standard air chuck or the like, for inflation and for the attachment of a valve cap after inflation has been completed and the air source has been removed. Inner member 21 also has a first bore 24 which receives a normally closed tire valve core 25 of standard design. Internal threads 26 are provided on a portion of this bore to secure the tire valve core 25 in the inner member 21. Tire valve core 25 has a plunger 27 which is depressed by the air source when the tire or container is being inflated. Inner member 21 also has a second bore 28 which communicates with and is concentric with first bore 24. Second bore 28 contains an annular groove 29 which receives an O-ring 30. This O-ring is used for sealing purposes which will be described later.

The portion of inner member 21 identified by the numeral 31 is of reduced diameter so that a passage is formed between its outer surface and bore 12. A coil spring 32 is received and positioned in this passage so that one end thereof is in contact with a shoulder 33 on inner member 21 while the other end thereof is in contact with a piston 34. Spring 32 may be precision wound and calibrated since its spring constant determines the pressure at which the inflation device will close preventing further inflation of the container or tire.

Received within second bore 28 of inner member 21 is the guide-like portion 35 of piston 34. This guide-like portion 35 is allowed to slide within second bore 28 and is sealed with respect to second bore 28 by means of 0-ring 30. Piston 34 is provided with a bore 36 for the passage of air to the container or tire. Bore 36 communicates with a bore 37 which receives a normally closed tire valve core 38 of standard design. Internal threads 39 are provided on a portion of bore 37 to secure the tire valve core 38 to the piston 34. piston 34 is also provided with outer diameters 40 and 41 which are in slideable contact with bores 12 and 13 respectively of outer casing 11. These outer diameters are connected by a truncated conical surface 42 which is in contact with truncated conical surface 17 of outer casing 11 when no back pressure is being applied against piston 34. An annular groove 43 is provided in outer diameter 41 to accommodate an 0-ring 44 which provides a sealing means between bore 13 and piston outer diameter 41. Piston outer diameter 41 is connected to piston outer diameter 45 by a truncated conical surface 46. Since the longitudinal length of the piston outer diameter 41 is less than the length of bore 13 and inasmuch as piston outer diameter 45 is smaller than bore 14, a back pressure passage 47 is formed by bore 13, truncated conical surface 18, bore 14, piston outer diameter 45 and truncated conical surface 46.

A depressor 48 is received in bore 15 so as to be adjacent shoulder 20. Depressor 48 depresses plunger 49 of tire valve core 38 opening the valve core permitting air to flow through the core. Longitudinal slots 50 are provided in the depressor to permit the flow of air to the tire or container. Tire valve core 38 is biased in the open position by depressor 48 and remains open until the desired predetermined pressure is reached in the container or tire.

Regarding attachment of the control device to the tire or container, the outer casing 11 is adapted for such attachment by having a reduced diameter 51 at one end thereof. Threads 52 are provided on a portion of reduced diameter 51 for engagement with fastening means. Reduced diameter 51 is received through apertures 53a, 54a and 55a which are provided in grommet 53, container or tire rim 54, and washer 55. These latter components are oriented so that grommet 53 is adjacent a shoulder 56 on outer casing 11, while the container or tire rim 54 is compressed between grommet 53 and washer 55. A nut 57 is fastened to threads 52 and tightened so as to provide a clamping force on the container or tire rim 54.

Another embodiment of the invention is shown in FIGS. 3 and 4. This embodiment differs from the aforementioned embodiment primarily in the manner in which the control device 10' is attached to the container or tire. Those parts which are similar to those previously enumerated are given like numerals with a "1" prefixed thereto and will not be reviewed further.

In this embodiment of the invention, a back pressure cavity 75 is provided between surface 76 of piston 134 and truncated conical surface 118 of outer casing 111. A depressor 77 is received in bores 114 and 115 of outer casing 111. Depressor 77 has two outer diameters 78 and 79 which are connected by a truncated conical surface 80. Outer diameters 78 and 79 are in contact with bores 114 and 115 respectively and truncated conical surface 80 is adjacent truncated conical surface 119. Depressor 77 depresses plunger 81 of tire valve core 138 opening the valve core permitting air to flow through the core. Longitudinal slots 82 are provided on the periphery of depressor 77 to allow air to flow past depressor 77 into the container or tire. Tire valve core 138 is held open by depressor 77 and remains open until the predetermined pressure is reached in the container or tire.

A gasket 83 is pressed into bore 116 and outer diameter 79 of depressor 77 is received through an aperture in gasket 83. Threads 84 are provided on a portion of bore 116 so that the pressurization control device can be attached to a valve stem. When this device is attached to such a valve stem, gasket 83 provides a seal between the device and the stem, and depressor 77 holds open the tire valve core within the valve stem.

Referring again to FIGS. 1 and 2, this inflation device operates in the following manner. The air source is connected to the threaded portion 23 of the inner member 21 and depresses plunger 27 of tire valve core 25. When plunger 27 is depressed, air is allowed to pass through the valve core 25, through first bore 24 and second bore 28 of inner member 21, and then through bore 36 into bore 37 of piston 34. Since the tire valve core 38 is held open by depressor 48 which is depressing plunger 49, the air is permitted to flow through tire valve core 38, past longitudinal slots 50 in depressor 48 and into the container or tire being inflated.

As the tire or container inflates, a back pressure develops in passage 47 which applies a force on the truncated conical surface 46 of piston 34. This back pressure increases as the container or tire becomes inflated and causes the piston 34 to move longitudinally within bore 13 so as to compress spring 32. Compression of spring 32 is directly proportional to the back pressure applied to piston 34. Such compression increases until the back pressure reaches a magnitude at which the longitudinal movement of the piston 34 is sufficient to permit the plunger 49 to assume its normal non-depressed position closing tire valve core 38 which prevents further inflation of the container or tire. The back pressure at which the valve core 38 closes is determined by the constant of spring 32, thus preventing over-inflation of the container or tire.

Operation of the second embodiment of the invention, as shown in FIGS. 3 and 4, is very similar to operation of the embodiment just described. The air source is connected to the threaded portion 123 of the inner member 121 and depresses plunger 127 of tire valve core 125. When plunger 127 is depressed, air is allowed to pass through valve core 125, through first bore 124 and second bore 128 of inner member 121, and then through bore 136 and into bore 137 of piston 134. Depressor 77 not only holds tire valve core 138 open, but also holds open the tire valve core in the valve stem to which the device is attached. Thus, the air is permitted to flow from bore 137 through tire valve core 138, past longitudinal slots 82 in depressor 77 and into the valve stem that is attached to the device.

As the container or tire inflates, a back pressure develops in cavity 75 which applies a force on surface 76 of piston 134. This back pressure increases as the container or tire becomes inflated and causes the piston 134 to move longitudinally within bore 113 so as to compress spring 132. Compression of spring 132 is directly proportional to the back pressure applied to piston 134. Such compression increases until the back pressure reaches a magnitude at which the longitudinal movement of the piston 134 is sufficient to permit the plunger 81 to assume its normal non-depressed position closing tire valve core 138 which prevents further inflation of the container or tire. The back pressure at which the valve core 138 closes is determined by the constant of spring 32, thus preventing over-inflation of the container or tire.

Variations of the present invention will be apparent to those having ordinary skill in the art and the invention is limited only by the spirit and scope of the following claims;

I claim:

1. A pressurization control device for the pressurization of a container to a predetermined maximum pressure, said device comprising:
   a housing having an axial bore therethrough, said housing having mounting means at one end thereof for sealingly mounting said housing to said container with said bore of said housing being in fluid communication with interior of said container, the other end of said housing having means to receive a source of pressurized fluid;
   a first normally closed valve operatively connected to said other end of said housing, said normally closed valve permitting pressurized fluid to enter said bore of said housing when said valve is opened;
   a piston having an axial bore therethrough slidably received in said housing bore intermediate said first normally closed valve and said one end of said housing, said piston having a face acted upon by pressure within said container to bias said piston towards said first normally closed valve;
   a second normally closed valve mounted to said piston for axial movement therewith and for controlling the flow of fluid through said axial piston bore, said second normally closed valve opening when said piston is axially adjacent said one end of said housing, and
   biasing means for urging said piston towards said one end of said housing, said predetermined maximum pressure acting upon said piston face being effective to overcome said biasing means to move said piston towards said first normally closed valve thereby allowing said second normally closed valve to close preventing further pressurization of said container.

2. A device as defined in claim 1 wherein said first normally closed valve is a standard tire valve core mounted in said axial bore of said housing adjacent said other and said second normally closed valve is a standard tire valve core mounted in said axial bore of said piston, said valve cores being on the same longitudinal axis and disposed in a back-to-back relationship.

3. A device as defined in claim 2, wherein said piston has a larger and a smaller face in fluid communication with the interior of said container, said larger face being acted upon by fluid pressure causing said piston to move longitudinally against said biasing means towards said first normally closed valve.

4. A device as defined in claim 3, wherein the difference in area between said larger and said smaller faces of said piston when multiplied by said predetermined maximum pressure equals a force sufficient to overcome said biasing means and allow said piston to move a sufficient longitudinal distance to allow said second normally closed valve to close.

5. A device as defined in claim 4, wherein said second normally closed valve is a tire valve core mounted in said axial bore of said piston, the valve core being held open by a depressor in contact with the actuating plunger of said valve core and remaining held upon until a predetermined pressure is reached in the interior of said container causing said piston to move a sufficient longitudinal distance to permit said plunger to assume a non-depressed condition closing said valve core.

6. A device as defined in claim 4, wherein said biasing means is a coil spring, said spring being of such construction so as to deflect a distance equal to the travel distance of the actuating plunger of said second normally closed tire valve when a predetermined compression force is applied to said spring, said force being equal to the difference in area between said larger and said smaller face of said piston multiplied by said predetermined maximum pressure.

7. A device as defined in claim 5, wherein said container is a pneumatic tire mounted on a tire rim.

8. The device of claim 5 wherein said first normally closed valve includes an axially extending tubular member and said piston includes a guide-like member telescopically received in said tubular member.

9. A pressurization control device for pressurization of a container to a predetermined maximum pressure, said device comprising:
   a housing having an axial bore therethrough, one end of said housing including mounting means for being received through an aperture in said container and for being sealingly mounted to said container, said means including a washer and fastening means adjacent said washer operative to exert a clamping force on said housing;
   the other end of said housing including means for receiving a source of pressurized fluid, a first normally closed valve operatively connected to said other end of said housing, said first normally closed valve permitting pressurized fluid to enter said bore of said housing when said valve is opened;
   a piston having an axial bore therethrough slidably and sealingly received in said housing bore intermediate said first normally closed valve and said one end of said housing, said piston having a larger and a smaller face in fluid communication with the interior of said container, said larger face being acted upon by fluid pressure causing said piston to move longitudinally toward said first normally closed valve;
   a second normally closed valve mounted to said piston for axial movement therewith and for controlling the flow of fluid through said axial piston bore, said second normally closed valve including an actuating plunger which will be depressed to open said second normally closed valve when said piston is adjacent said one end of said housing, and
   biasing means for urging said piston towards said one end of said housing, said predetermined maximum pressure acting upon said piston faces being effective to overcome said biasing means to move said piston toward said first normally closed valve to release said actuating plunger and allow said second normally closed valve to close thereby preventing further pressurization of said container.

10. A pressurization control for pressurization of a tire to a predetermined maximum pressure, said device comprising:

a housing having an axial bore therethrough, one end of said housing including mounting means for being threadably and sealingly received on a standard tire valve stem mounted through an aperture in a tire rim, said mounting means including means to depress the actuating plunger of said standard tire valve to open said valve thereby placing said housing bore in fluid communication with the interior of tire, the other end of said housing including means for receiving a source of pressurized fluid, a first normally closed valve operatively connected to said other end of said housing, said first normally closed valve permitting pressurized fluid to enter said bore of said housing when said valve is opened;

a piston having an axial bore therethrough slidably and sealingly received in said housing bore intermediate said first normally closed valve and said one end of said housing said piston having a larger and smaller face in fluid communication with the interior of said container, said larger face being acted upon by fluid pressure causing said piston to move longitudinally toward said first normally closed valve;

a second normally closed valve mounted to said piston for axial movement therewith and for controlling the flow of fluid through said axial piston bore, said second normally closed valve including an actuating plunger which will be depressed to open said second normally closed valve when said piston is adjacent said one end of said housing, and biasing means for urging said piston towards said one end of said housing, said predetermined maximum pressure acting upon said piston faces being effective to overcome said biasing means to move said piston towards said first normally closed valve to release said actuating plunger and allow said second normally closed valve to close thereby preventing further pressurization of said container.

11. The device of claim 10 wherein said first and second normally closed valves are standard tire valve cores mounted in back-to-back coaxial relationship.

* * * * *